(12) United States Patent
Chakraborty et al.

(10) Patent No.: US 8,464,238 B1
(45) Date of Patent: Jun. 11, 2013

(54) METHOD AND SYSTEM FOR MANAGING STORAGE AREA NETWORKS

(75) Inventors: Saptarshi Chakraborty, Irvine, CA (US); Sharvil Shah, Irvine, CA (US); Richard V. Pham, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1853 days.

(21) Appl. No.: 11/343,596

(22) Filed: Jan. 31, 2006

(51) Int. Cl.
*G06F 9/44* (2006.01)
*G06F 9/445* (2006.01)
*G06F 15/177* (2006.01)

(52) U.S. Cl.
USPC ........... 717/168; 717/170; 717/171; 717/173; 717/174; 709/220

(58) Field of Classification Search
USPC .................. 717/168, 175, 136, 170; 719/321, 719/327, 313; 713/2, 100; 709/224, 222, 709/220, 221, 246; 710/301
See application file for complete search history.

(56) References Cited

U.S. PATENT DOCUMENTS

| | | | |
|---|---|---|---|
| 4,162,375 A | 7/1979 | Schlichte | |
| 4,425,640 A | 1/1984 | Philip et al. | |
| 4,546,468 A | 10/1985 | Christmas et al. | |
| 4,569,043 A | 2/1986 | Simmons et al. | |
| 4,725,835 A | 2/1988 | Schreiner et al. | |
| 4,821,034 A | 4/1989 | Anderson et al. | |
| 5,144,622 A | 9/1992 | Takiyasu et al. | |
| 5,247,683 A * | 9/1993 | Holmes et al. | 709/221 |
| 5,367,520 A | 11/1994 | Cordell | |
| 5,598,541 A | 1/1997 | Malladi et al. | |
| 5,610,745 A | 3/1997 | Bennett | |
| 5,687,172 A | 11/1997 | Cloonan et al. | |
| 5,732,282 A * | 3/1998 | Provino et al. | 719/324 |
| 5,745,686 A * | 4/1998 | Saito et al. | 717/168 |
| 5,748,612 A | 5/1998 | Stoevhase et al. | |
| 5,818,842 A | 10/1998 | Burwell et al. | |
| 5,987,028 A | 11/1999 | Yang et al. | |
| 5,999,528 A | 12/1999 | Chow et al. | |
| 6,014,383 A | 1/2000 | McCarty | |
| 6,021,128 A | 2/2000 | Hosoya et al. | |
| 6,047,323 A | 4/2000 | Krause | |
| 6,081,512 A | 6/2000 | Muller et al. | |
| 6,128,292 A | 10/2000 | Kim et al. | |
| 6,160,813 A | 12/2000 | Banks et al. | |
| 6,308,220 B1 | 10/2001 | Mathur | |

(Continued)

OTHER PUBLICATIONS

Author:Microsoft Corporation Title: Storport in Windows Server 2003: Improving Manageability and Performance in Hardware Raid and Storage Area Networks. Date:Dec. 2003 Publisher:White Pages Microsoft Corporation Publication: pp. 17.*

(Continued)

*Primary Examiner* — Thuy Dao
*Assistant Examiner* — Ziaul A Chowdhury
(74) *Attorney, Agent, or Firm* — Klein, O'Neill & Singh, LLP (57) ABSTRACT

Method and system for converting identifier information after a driver upgrade is provided. The method includes updating a driver for a peripheral device in a storage area network, wherein a first driver is replaced by a second driver and the peripheral device is operationally coupled to one or more target device; reading identifier information for the target devices; and converting identifier information for the target device from a format supported by the first driver to a format supported by the second driver.

16 Claims, 10 Drawing Sheets

U.S. PATENT DOCUMENTS

| | | | |
|---|---|---|---|
| 6,324,181 B1 | 11/2001 | Wong et al. | |
| 6,330,236 B1 | 12/2001 | Ofek et al. | |
| 6,363,423 B1* | 3/2002 | Chiles et al. | 709/224 |
| 6,397,327 B1* | 5/2002 | Klebanov | 713/1 |
| 6,411,599 B1 | 6/2002 | Blanc et al. | |
| 6,424,658 B1 | 7/2002 | Mathur | |
| 6,442,683 B1* | 8/2002 | Fleming, III | 713/1 |
| 6,449,274 B1 | 9/2002 | Holden et al. | |
| 6,597,691 B1 | 7/2003 | Anderson et al. | |
| 6,640,278 B1* | 10/2003 | Nolan et al. | 711/6 |
| 6,665,714 B1* | 12/2003 | Blumenau et al. | 709/222 |
| 6,697,359 B1 | 2/2004 | George | |
| 6,697,924 B2* | 2/2004 | Swank | 711/163 |
| 6,848,007 B1* | 1/2005 | Reynolds et al. | 709/245 |
| 6,892,264 B2* | 5/2005 | Lamb | 710/301 |
| 6,892,299 B2* | 5/2005 | Abe | 713/2 |
| 6,892,381 B2* | 5/2005 | Kim et al. | 717/171 |
| 6,915,514 B1* | 7/2005 | Machida | 717/174 |
| 6,934,956 B1* | 8/2005 | Allen | 719/327 |
| 7,051,198 B2* | 5/2006 | Cabrera et al. | 713/100 |
| 7,089,562 B1* | 8/2006 | Kanevsky et al. | 719/313 |
| 7,316,022 B2* | 1/2008 | Nishio | 719/321 |
| 7,328,260 B1* | 2/2008 | Muthiyan et al. | 709/224 |
| 7,330,967 B1* | 2/2008 | Pujare et al. | 713/2 |
| 7,401,139 B1* | 7/2008 | Allen et al. | 709/224 |
| 7,461,141 B2* | 12/2008 | Byers et al. | 709/221 |
| 7,483,963 B2* | 1/2009 | Zhang et al. | 709/220 |
| 7,788,349 B2* | 8/2010 | Tada | 709/220 |
| 7,921,420 B2* | 4/2011 | Ferlitsch | 717/170 |
| 7,971,199 B1* | 6/2011 | Chen | 717/168 |
| 8,316,362 B2* | 11/2012 | Pan et al. | 717/168 |
| 2002/0073415 A1* | 6/2002 | Kim et al. | 717/173 |
| 2002/0144242 A1* | 10/2002 | Owhadi | 717/137 |
| 2003/0016683 A1 | 1/2003 | George et al. | |
| 2003/0051069 A1* | 3/2003 | Iida | 709/321 |
| 2003/0051084 A1* | 3/2003 | Rosen | 710/72 |
| 2003/0179748 A1 | 9/2003 | George et al. | |
| 2003/0189935 A1 | 10/2003 | Warden et al. | |
| 2004/0028038 A1 | 2/2004 | Anderson et al. | |
| 2004/0085563 A1* | 5/2004 | Nishimura | 358/1.13 |
| 2004/0098714 A1* | 5/2004 | Metz | 717/168 |
| 2004/0141521 A1 | 7/2004 | George et al. | |
| 2004/0226024 A1* | 11/2004 | Rosenbloom et al. | 719/321 |
| 2004/0250265 A1* | 12/2004 | Suzuki et al. | 719/321 |
| 2004/0260845 A1* | 12/2004 | Inokuchi | 710/8 |
| 2005/0038927 A1* | 2/2005 | Choi et al. | 710/8 |
| 2005/0039193 A1* | 2/2005 | Choi et al. | 719/321 |
| 2005/0149921 A1* | 7/2005 | Rollins | 717/168 |
| 2005/0198236 A1* | 9/2005 | Byers et al. | 709/222 |
| 2006/0200817 A1* | 9/2006 | Callender | 717/170 |
| 2006/0238791 A1* | 10/2006 | Jiang et al. | 358/1.13 |
| 2008/0151283 A1* | 6/2008 | Wang et al. | 358/1.13 |

OTHER PUBLICATIONS

Downloading the Storport Miniport Driver for Windows Server 2003, Version 1.02a5. Emulex Documentation, Driver and Software, EMULEX Coporation. Published Date: 2004. pp. 1-133.*

An Optimal Approach: Emulex Corporation's Implementation of a Windows Server 2003 Storport Miniport Driver. Technology Brief, EMULEX Corporation. Published Date: Dec. 2004. pp. 1-8. <www.emulex.com>.*

Boot from SAN in Windows Server 2003 and Wndows 2000 Server. Microsoft Corporation. Dec. 2003. pp. 1-25. <http://www.google.com/search>.*

Matthew Conover et al., "Assessment of Windows Vista Kernel-Mode Security", [Online], pp. 1-16, 2006, [Retrieved from internet on Apr. 26, 2013], <http://citeseerx.ist.psu.edu/viewdoc.download-?doi=10.1.1.91.576&rep=1&type=pdf>.*

Liuba Srira et al., "Time travel in the virtualized past cheap fares and first class seats" [Online], 2007, pp. 1-6, [Retrieved from Internet on Apr. 26, 2013], <http://www.cs.brandeis.edu/~rshaull/publications/skippy-systor07.pdf>.*

Mike Mesnier et al., "Object-Based Storage", [Online], IEEE 2003, pp. 84-90, [Retrieved from Internet on Apr. 28, 2013], <http://www.storagevisions.com/White%20Papers/MesnierIEEE03.pdf>.*

Ashish A. Palekar et al., "Design and Implementation of a SCSI Target for Storage Area Networks", [Online], May 2001, pp. 1-84, [Retrived from Internet on Apr. 28, 2013], <http://www.storagevisions.com/White%20Papers/MesnierIEEE03.pdf>.*

Clark, Tom, "Zoning for Fibre Channel Fabrics", *Vixel Corporation Paper*- XP002185194, (Aug. 1999), 1-6.

Desanti, "Virtual Fabrics", *Virtual Fabrics*, T11/03-352v0, (May 2003),1-4.

Desanti, Claudio, "Virtual Fabrics Switch Suppport", *VF Switch Support*, T11/04-395v2, (Sep. 2004), 1-15.

Malavalli, Kumar, "Distributed Computing With Fibre Channel Fabric", *Proc. of the Computer Soc. Int'l Conf., Los Alamitos, IEEE Comp. Soc. Press.*, vol. Conf. 37, XP000340745, (Feb. 24, 1992),269-274.

Martin, Charles R., "Fabric Interconnection of Fibre Channel Standard Nodes", *Proceedings of the SPIE*, (Sep. 8, 1992),65-71.

Martin, "Virtual Channel Architecture", *Presentation by Brocade to T11/03-369V0*, (00/02/2003).

Melhem, et al., "Minimizing Wavelength Conversions in WDM Path Establishment", *Computer Science Department, University of Pittsburgh*, Pittsburgh, PA 15260, (2001),197-211.

Pelissier, "Inter-Fabric Routing", *Inter Fabric Routing* (04-520v0), (Jul. 30, 2004),1-31.

Yoshida, Hu, "Lun Security Considerations for Storage Area Networks", *Hitachi Data Systems Paper*—XP 002185193 (1999), 1-4.

"Fibre Channel Switch Fabric—2(FC-SW-2) Rev 5.4 NCITS Working Draft Proposed American National Standard for Information Technology", *T11/Project 1305-D/Rev 5.4*, (Jun. 2001).

"Fibre Channel Generic Service—3 (FC-GS-3) Rev. 7.01, NCITS Working Draft Proposed American National Standard for Information Technology,", *T11/Project 1356 D/Rev 7.01*, (Nov. 28, 2000).

* cited by examiner

METHOD AND SYSTEM FOR MANAGING STORAGE AREA NETWORKS

BACKGROUND

1. Field of the Invention

The present invention relates to storage systems, and more particularly, to managing storage systems.

2. Background of the Invention

Storage area networks ("SAN") are commonly used to store and access data. SAN is a high-speed sub-network of shared storage devices, for example, disks and tape drives. A computer system (may also be referred to as a "host") can access data stored in the SAN.

Typical SAN architecture makes storage devices available to all servers that are connected using a computer network, for example, a local area network or a wide area network. The term server in this context means any computing system or device coupled to a network that manages network resources. For example, a file server is a computer and storage device dedicated to storing files. Any user on the network can store files on the server. A print server is a computer that manages one or more printers, and a network server is a computer that manages network traffic. A database server is a computer system that processes database queries.

Efforts are being made to upgrade drivers/software systems to manage SANs and SAN components. One challenge with changing drivers is that certain SAN based information gets lost when a system migrates from one driver to another driver. Therefore, there is a need for a method and system to automatically update information when new driver/software is used.

SUMMARY OF THE INVENTION

In one aspect of the present invention, a method for converting identifier information after a driver upgrade is provided. The method includes updating a driver for a peripheral device in a storage area network, wherein a first driver is replaced by a second driver and the peripheral device is operationally coupled to one or more target device; reading identifier information for the target devices; and converting identifier information for the target device from a format supported by the first driver to a format supported by the second driver.

In another aspect of the present invention, a host computing system operationally coupled to a peripheral device that is operationally coupled to plural target devices via a storage area network ("SAN") is provided. The host computing system includes a processor for executing a management application for managing plural SAN components; and a driver for communicating with the peripheral device, wherein the driver is updated from a first driver to a second driver, and the first driver is replaced by the second driver and identifier information for the target devices is converted from a format supported by the first driver to a format supported by the second driver.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiments, the general architecture and operation of a system using storage devices and various standards will be described. The specific architecture and operation of the preferred embodiment will then be described with reference to the general architecture.

Various components and standard interfaces are used to move data from host systems to storage devices in a SAN. Fibre channel is one such standard. Fibre channel (incorporated herein by reference in its entirety) is an American National Standard Institute (ANSI) set of standards, which provides a serial transmission protocol for storage and network protocols such as HIPPI, SCSI (small computer system interface), IP, ATM and others. Fibre channel provides an input/output interface to meet the requirements of both channel and network users.

Host systems often communicate with storage systems in a SAN via a host bus adapter ("HBA") using the "PCI" bus interface. PCI stands for Peripheral Component Interconnect, a local bus standard that was developed by Intel Corporation®. The PCI standard is incorporated herein by reference in its entirety. PCI-X/PCI-Express are other standard buses that provide a better throughput than PCI. Both the PCI-X/PCI-Express standards are incorporated herein by reference in their entirety.

The iSCSI standard (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

The iSCSI architecture is based on a client/server model. Typically, the client is a host system such as a file server that issues a read or write command. The server may be a disk array that responds to the client request. Devices that request I/O processes are called initiators. Targets are devices that perform operations requested by initiators. Each target can accommodate up to a certain number of devices, known as logical units, and each is assigned a Logical Unit Number (LUN).

Figure 1A:
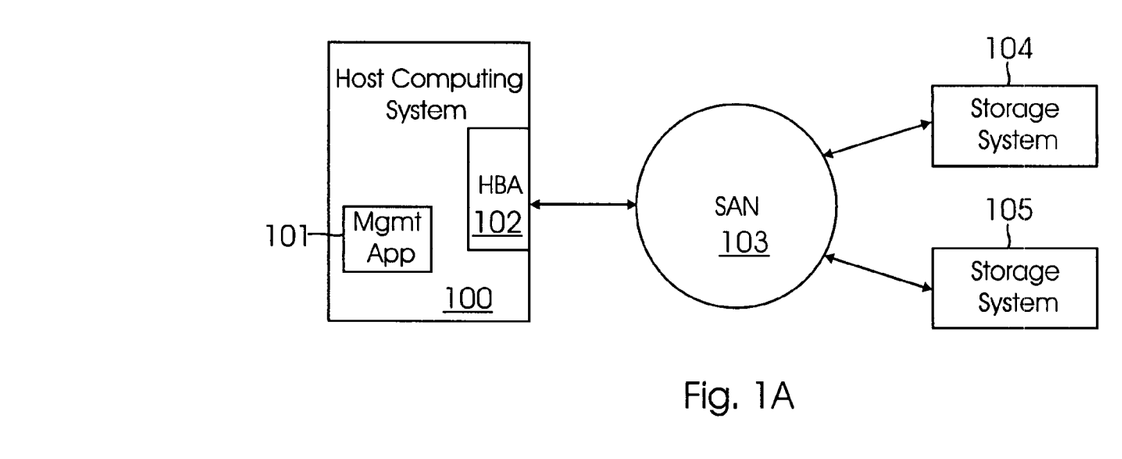
FIG. 1A shows a top-level system diagram with a host system running a management application, according to one aspect of the present invention.

FIG. 1A shows an example of a host system 100 coupled to a SAN 103 via a HBA 102. Host system 100 can access storage devices (may also be referred to as targets) 104 and 105 via HBA 102. It is noteworthy that a host system 100, as referred to herein, may include a computer, server or other similar devices, which may be coupled to storage systems.

Management application 101 runs on host system 100 or remotely. Storage vendors use management applications to manage SAN components. One such application is the QLogic SanSurfer FC HBA Manager that is provided by QLogic Corporation, the assignee of the present application. Management application 101 is described below with respect to FIGS. 2-7.

Figure 1B:
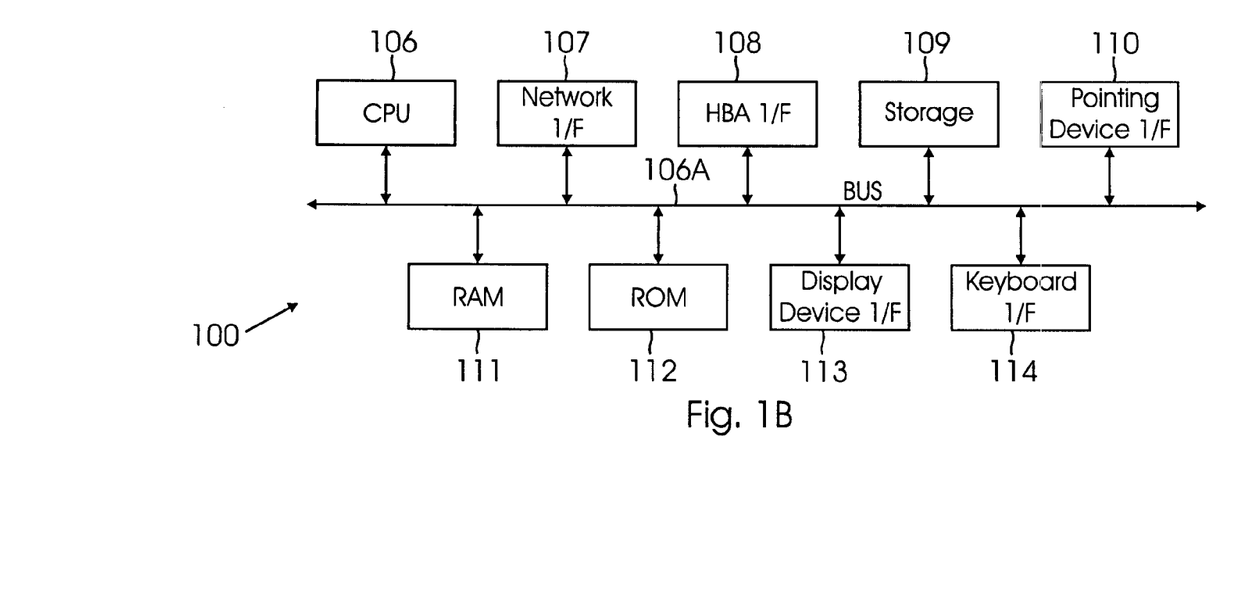
FIG. 1B shows the internal architecture of the host system of FIG. 1A.

FIG. 1B is a block diagram showing the internal functional architecture of host system 100. As shown in FIG. 1B, host system 100 includes a microprocessor or central processing unit ("CPU") 106 that interfaces with a computer bus 106A for executing computer-executable process steps. Also shown in FIG. 1B are a network interface 107 that provides a network connection, and an adapter interface 108 that interfaces host system 100 with adapter 102. It is noteworthy that interface 107 and 108 may be a part of adapter 102 and the present invention is not limited to any particular type of network or adapter interface.

Host system 100 also includes a display device interface 113, a keyboard interface 114, a pointing device interface 110, and a storage device 109 (for example, a disk, CD-ROM or any other device).

Storage 109 may store operating system program files, application program files (for example, management application 101, according to one aspect of the present invention), and other files. Some of these files are stored on storage 109 using an installation program. For example, CPU 106 executes computer-executable process steps of an installation program so that CPU 106 can properly execute the application program.

A random access main memory ("RAM") 111 also interfaces with computer bus 106A to provide CPU 106 with access to memory storage. When executing stored computer-executable process steps from storage 109, CPU 106 stores and executes the process steps out of RAM 111.

Read only memory ("ROM") 112 is provided to store invariant instruction sequences such as start-up instruction sequences or basic input/output operating system (BIOS) sequences for operation of a keyboard (not shown).

Computing systems typically use an operating system that provides an interface between application programs and hardware connected to the computing systems. The operating system typically uses a device driver to interface with a peripheral device. The driver provides a set of routines/subroutines that implements device specific aspects of input/output (I/O) operations.

Figure 1C:
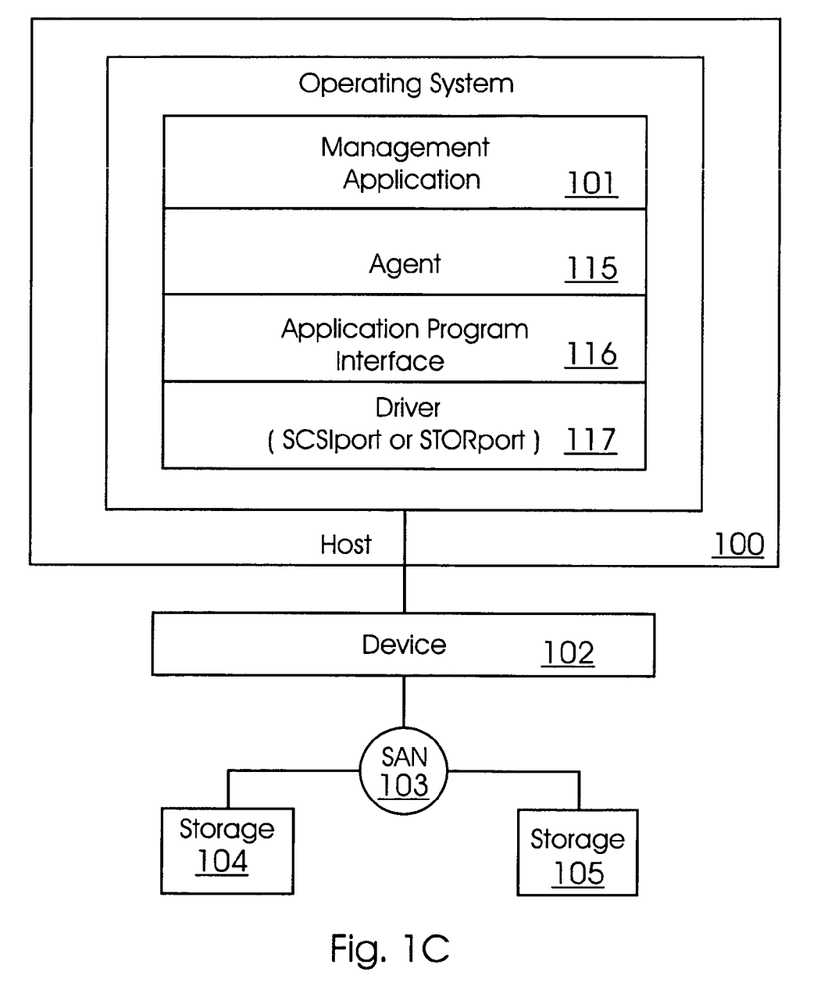
FIG. 1C shows a top-level software architecture using a management application, according to one aspect of the present invention.

FIG. 1C shows a layered software architecture that is typically used by a host system 100 to interact with SAN components. This architecture is commonly used in the Windows environment. Management application 101 interfaces with device 102 (or HBA 102) via an agent 115. Agent 115 is a program routine that interfaces between management application 101 and an application program interface (API) 116. API 116 interfaces with a driver 117 that allows interfaces with device 102 (device 102 firmware). The term driver as used herein includes software code that allows an operating system/application to interface with a device.

Microsoft Corporation® that markets Windows Server 2003® and Windows Storage Server 2003® provides certain storage drivers/software (117). One such driver is the SCSI device driver that is provided by Microsoft Corporation. The SCSI device driver includes a class driver, a SCSIport driver and a SCSI miniport driver. The SCSIport driver translates an input/output (I/O) request into a SCSI request block (SRB) and queues it to the miniport driver, which decodes the SRB and translates it into a specific format required by the HBA.

A new driver called the "Storport" driver is now being provided that has better performance than the SCSIport driver. Storage vendors, i.e., companies that make storage devices and HBAs are being encouraged to use the Storport driver instead of the SCSIport driver.

When a user migrates from the SCSIport driver to the Storport driver, the user can lose vital information for managing the SAN. A user then will have to enter the data manually into the upgraded system (i.e. the system using Storport Driver). One such element or piece of information that is lost is a part of "target persistent" data. Target persistent data includes information that is used to uniquely identify a target (for example, 104 and 105), as described below in detail. In one aspect of the present invention, a method and system is provided that updates target persistent binding data so that manual entry is not required.

Figure 1D:
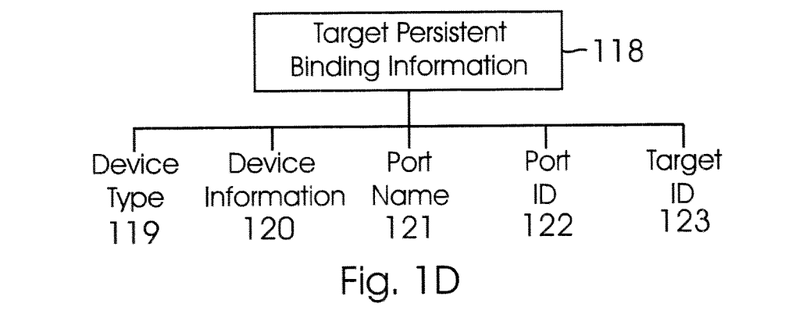
FIG. 1D shows an example of target persistent information that is formatted, according to one aspect of the present invention.

FIG. 1D shows an example of target persistent data 118 that is used to manage storage devices in a SAN. Data 118 has various components/fields, for example: (a) Device type 119 indicates the type of storage device; (b) Device Information 120 provides information about the device, for example, a manufacturer's name and product number; (c) Port Name 121 is a unique World Wide Name (WWN) that is assigned to a target coupled via a port of HBA 102; (d) Port Identifier 406 (also shown as 121 in FIG. 1D) is unique port identifier for the target that is accessible by HBA 102; and (e) Target Identifier (ID) 123 is a value that is assigned to the target and is shorter than the WWN. It is the Target ID value (123) that can be lost when a user migrates from the SCSIport driver to the STORport driver or vice-versa, and the present invention solves this problem, as described below with respect to FIG. 2 and the screen shots shown in FIG. 3-7.

Figure 2:
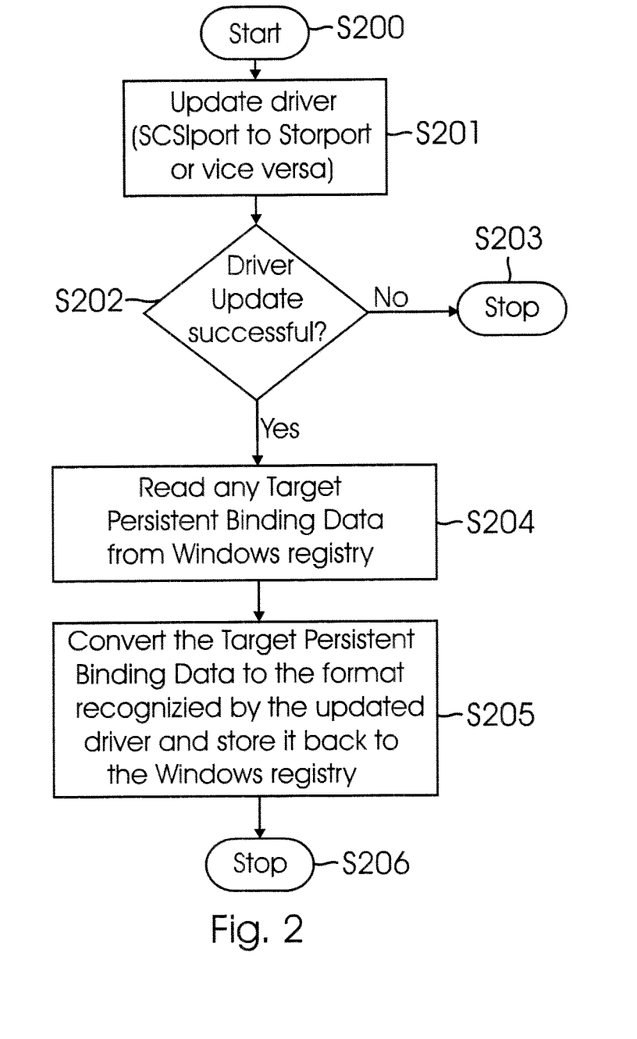
FIG. 2 is a process flow diagram for maintaining target persistent data, according to one aspect of the present invention.

Turning in detail to FIG. 2, the process of upgrading a driver (for example, to replace a SCSIport driver by a STORport driver) starts in step S200. In step S201, the SCSIport driver is updated and replaced by STORport driver. If the update is not successful, as determined in step S202, the process stops in step S203 or is restarted.

If the update is successful, then target persistent data is read from the Windows Registry (stored in storage 109). The Windows registry is maintained by the Windows Operating system and stores configuration information. In step S205, the target persistent data is converted into a format that is recognized by the new driver, i.e., the STORport driver. The management application 101 performs the conversion. The process ends in step S206. Without the conversion, one will have to manually enter the target persistent information into the Windows Registry. This is a tedious task, especially since the target ID information is stored as binary data in the Windows Registry.

FIGS. 3-7 show screen shots using management application SANsurfer FC HBA Manager provided by QLogic Corporation, the assignee of the present application, according to one aspect of the present invention. This application is run on a host computing system, similar to system 100. The screen shots are provided only as an example and the present invention is not limited to the layout or any other feature of the user interface.

Figure 3:
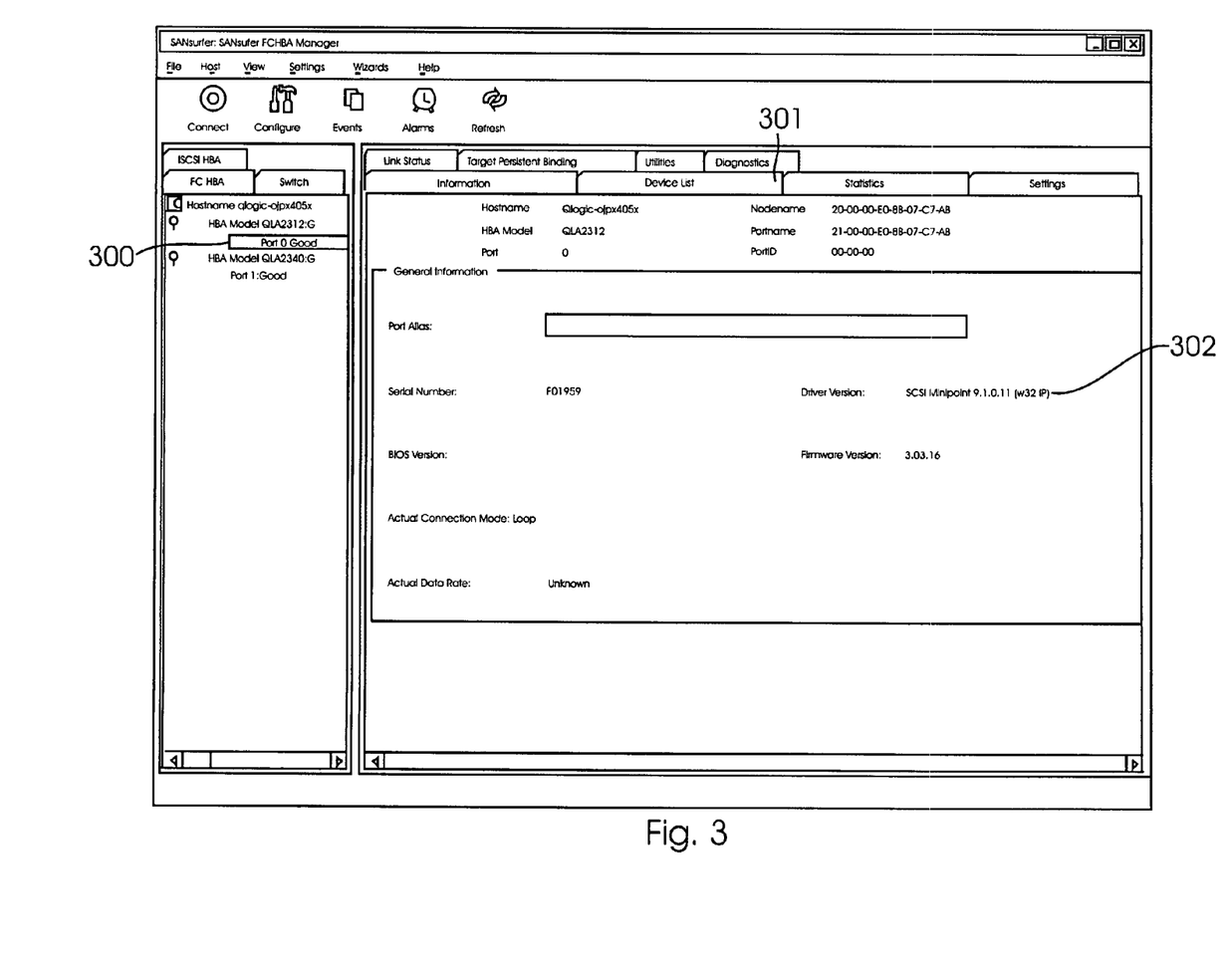
FIGS. 3-7 are screen shots showing how target data is maintained after driver migration, according to one aspect of the present invention.

FIG. 3 provides a user interface where the "device list" 301 is highlighted (or selected by a user). The device in this instance is a HBA model number QLA2312 with port 0 (shown as 300) and port 1. The driver used in this screen shot is SCSI Miniport 302.

Figure 4A:
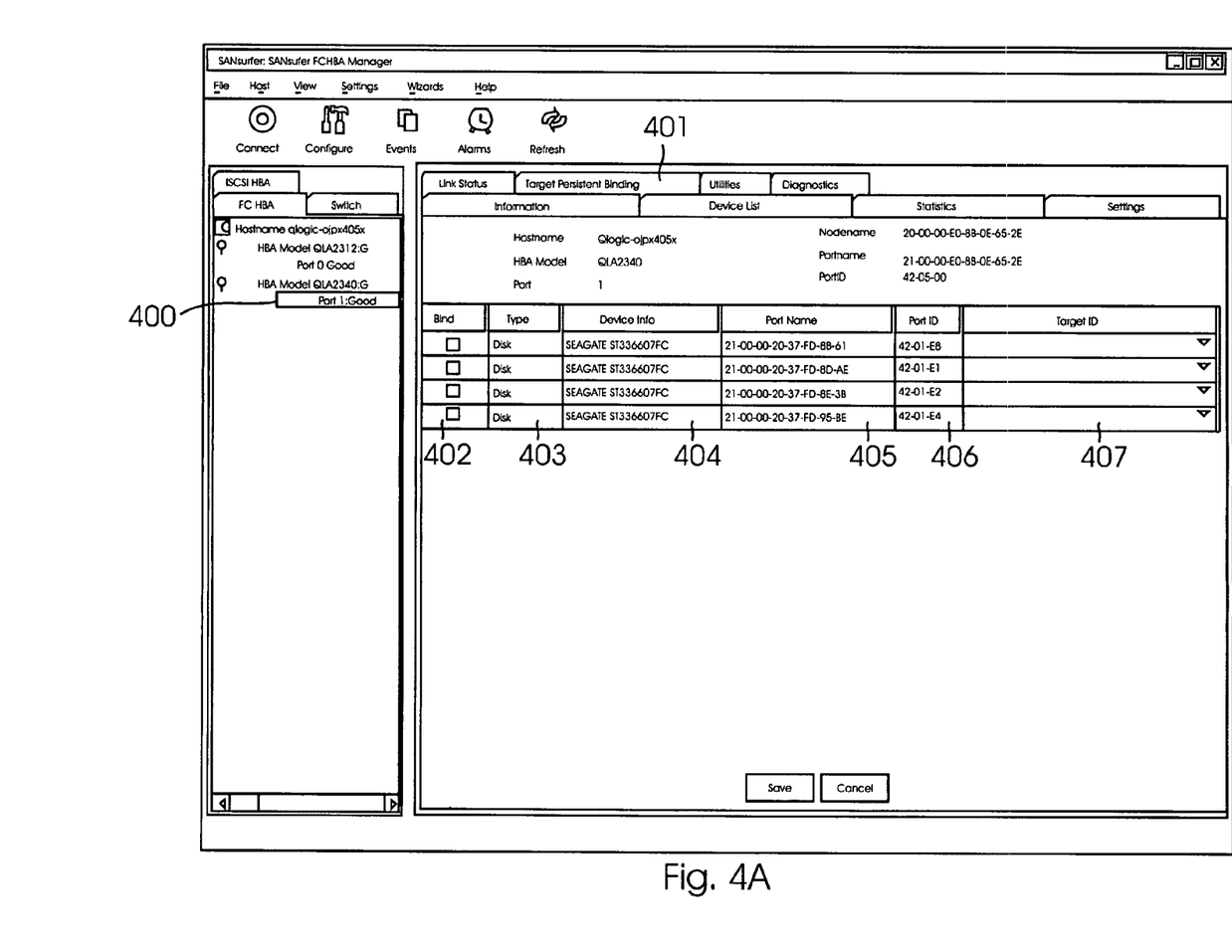
Figure 4B:
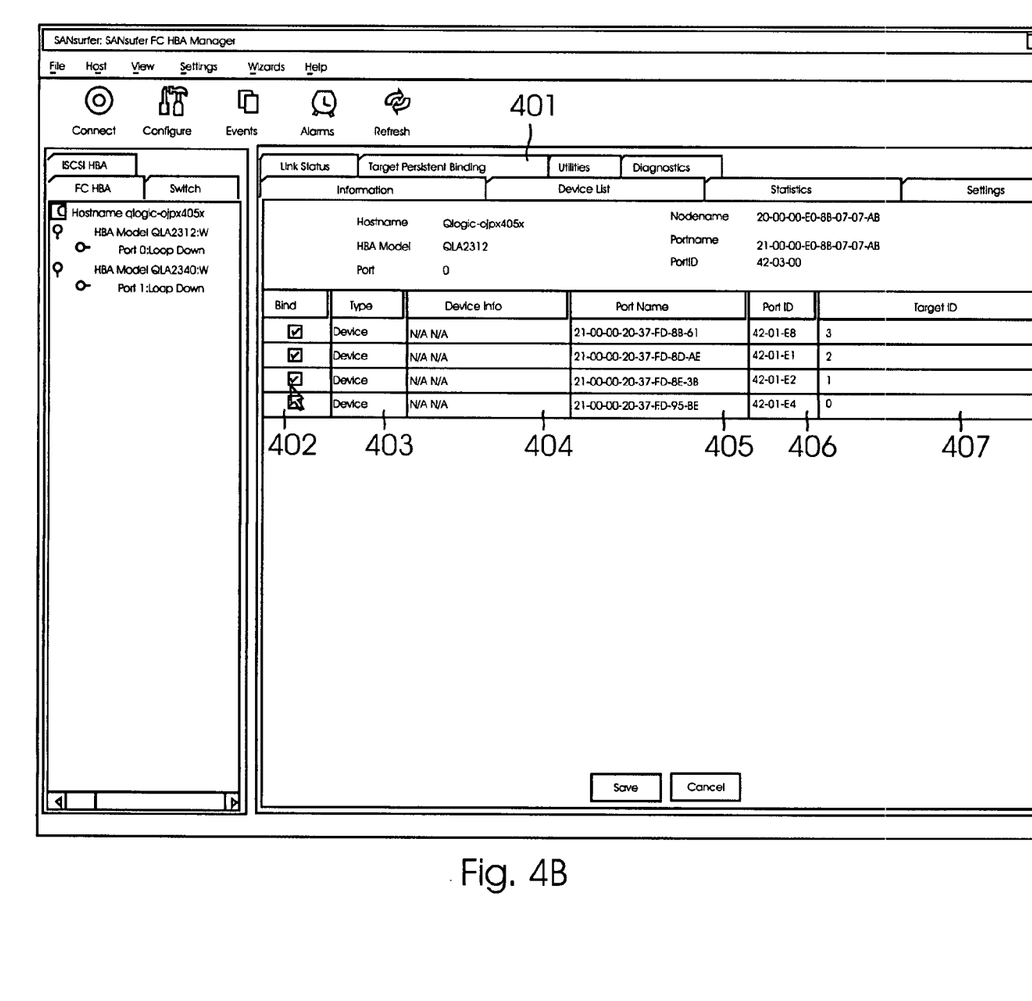
Figure 4C:
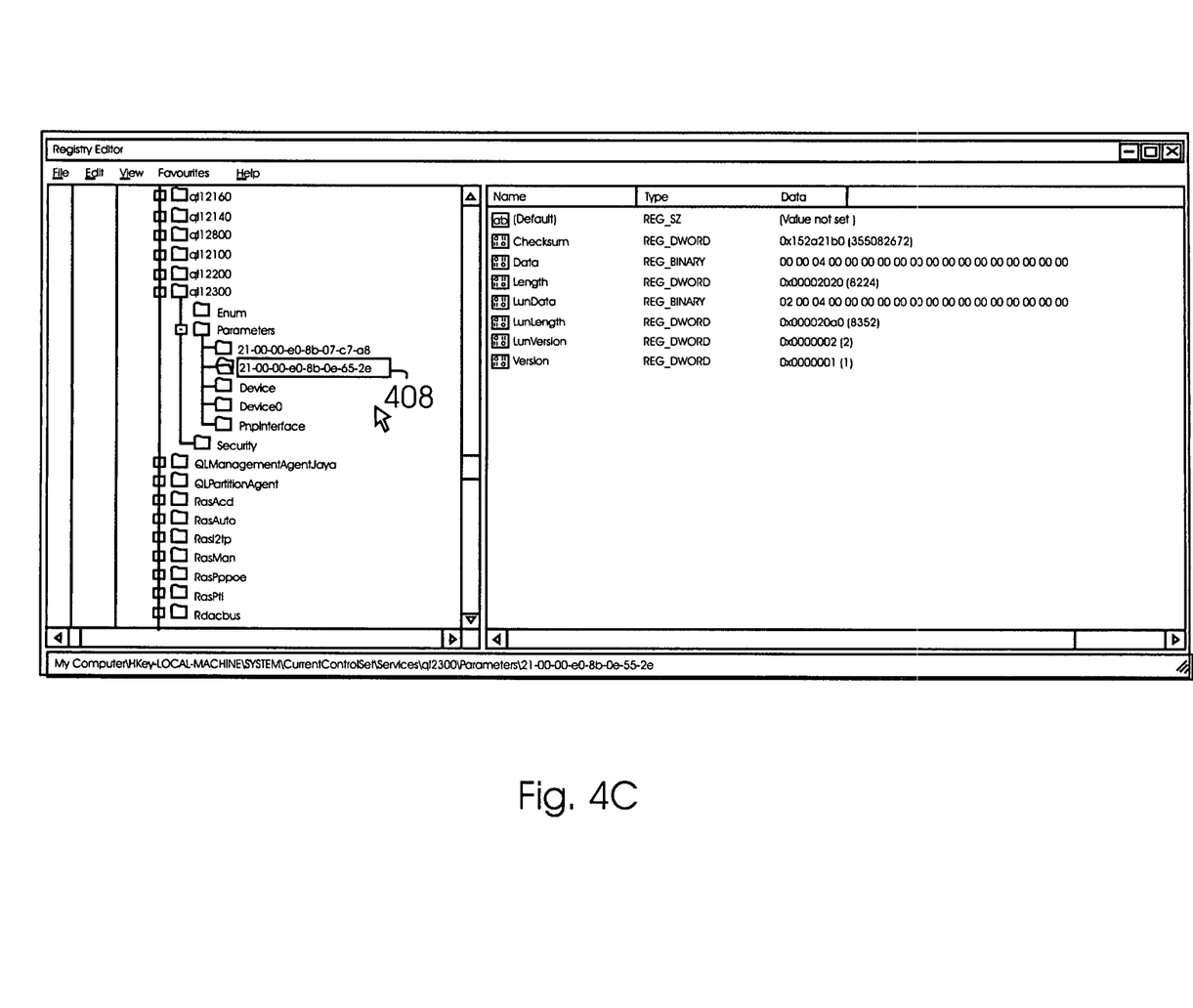
Figure 6:
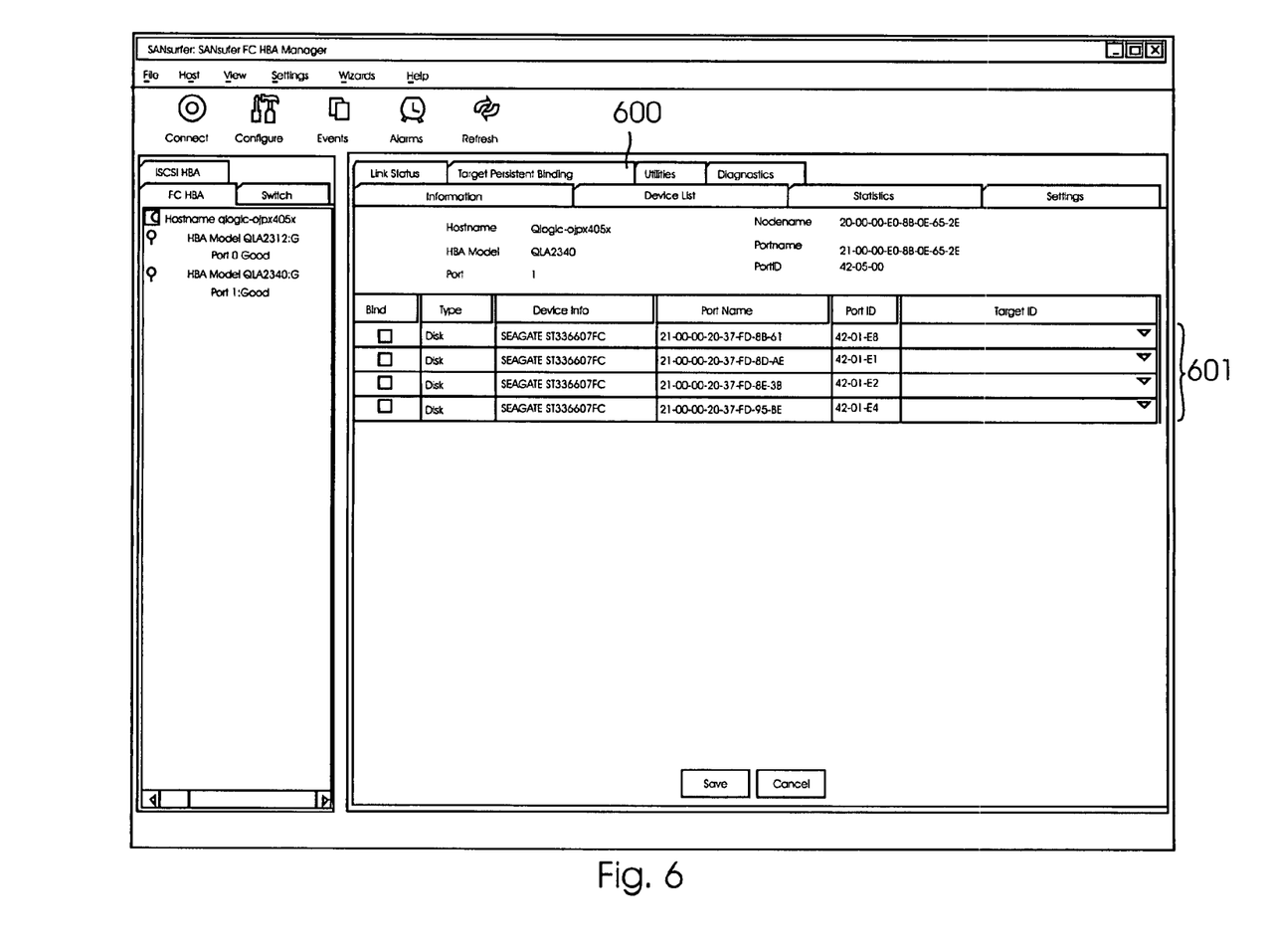
Figure 7:
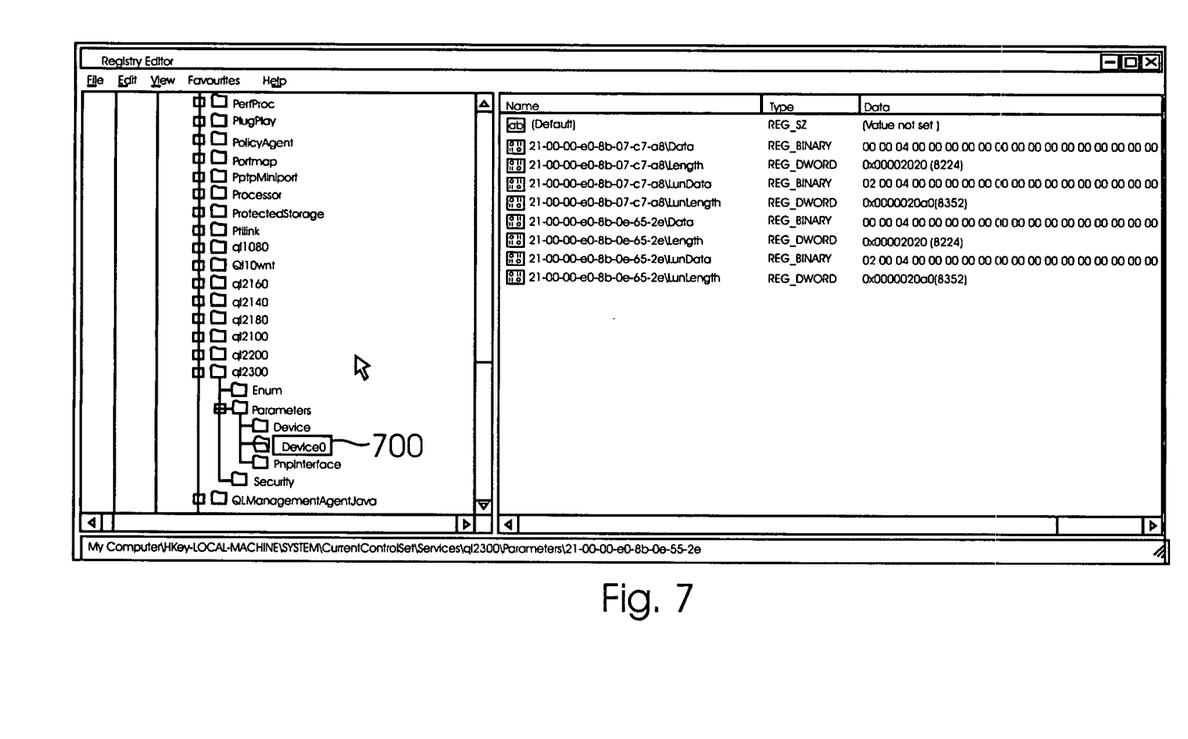

FIG. 4A provides an interface when the user selects "target persistent" tab 401. The user is shown segments 402-407. Segment 402 allows a user to select the option "bind". This selection will bind a particular target to port 1 (shown as 400). The type of target (shown as disk) is provided in segment 403. Device information 404 provides the device model number. Port name is provided in segment 405 and port ID is provided in segment 406. The target ID 407 is an identifier that identifies the target with a value that is smaller than port name. FIG. 4B shows the target IDs 3, 2, 1, and 0 for the various devices. FIG. 4B also shows that the user has selected the "bind" option. The target ID information is shown in the Windows registry and is shown in FIG. 4C as item 408. Once the user migrates to the STORport driver, the target ID values are typically lost. The present invention solves this problem, as shown in FIGS. 5-7.

Figure 5:
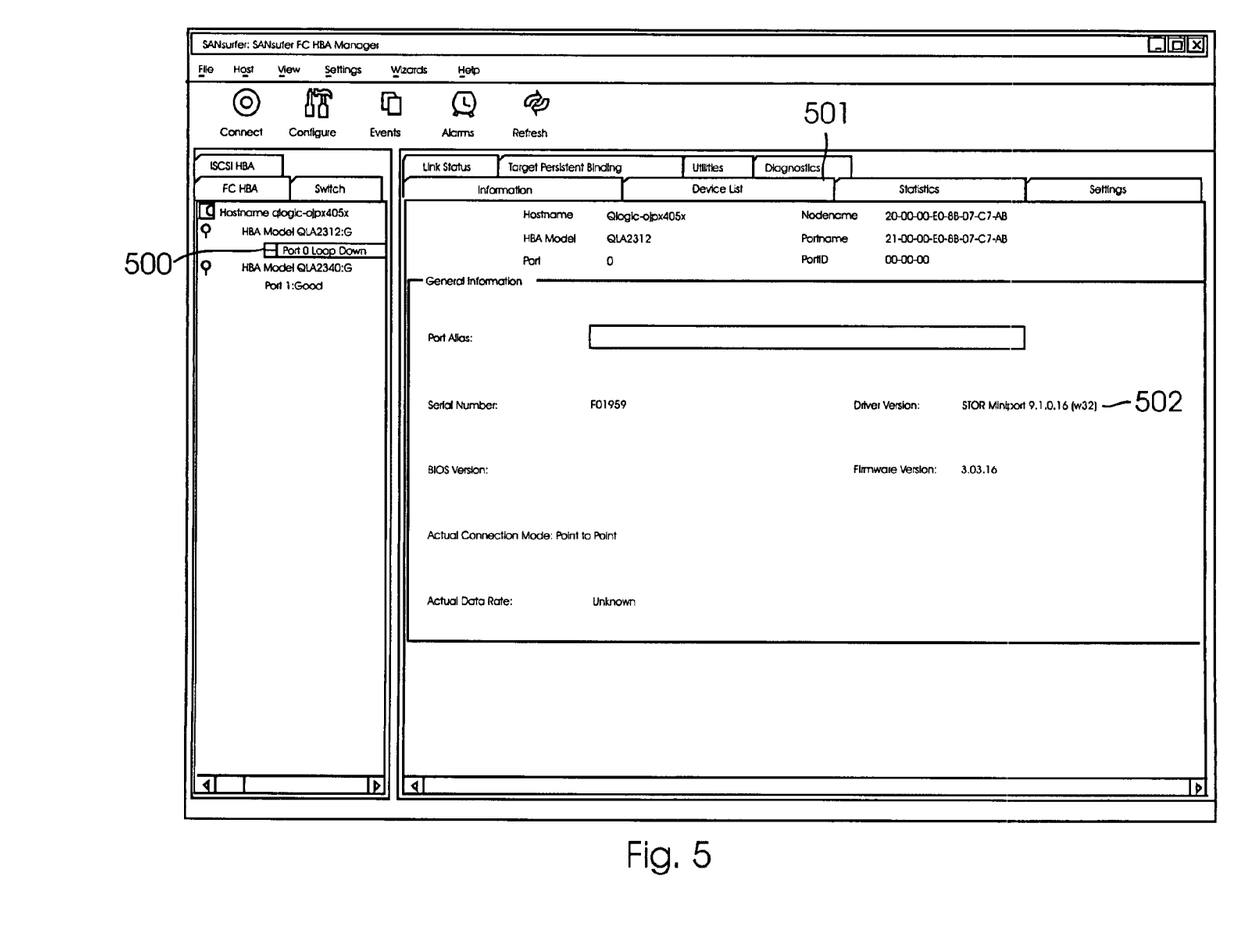

FIG. 5 is similar to FIG. 3, except the driver is STORport (shown as 502). The device list 501 is similar to 301 and item 500 in FIG. 5 is similar to 300 in FIG. 3. FIG. 6 is similar to FIG. 4A where item 600 is similar to 401. The target IDs are shown as 601. FIG. 7 shows the converted target ID values when the STORport driver is used instead of the SCSIport driver. The information is shown as 700.

It is noteworthy that the present invention maintains and converts target ID values if a user migrates from STORport driver to SCSIport driver.

In one aspect of the present invention, a user does not have to manually select or enter target ID values when the user moves from one driver to another. The management application converts the target ID values so that they can be used with the appropriate drivers.

Although the present invention has been described with reference to specific embodiments, these embodiments are illustrative only and not limiting. Many other applications and embodiments of the present invention will be apparent in light of this disclosure and the following claims.

What is claimed is:

1. A computer implemented method comprising:
   replacing a first driver with a second driver, the drivers executed by a computing system coupled to a peripheral device that is operationally coupled to one or more target devices in a storage area network, the first driver complying with a first protocol and the second driver complying with a second protocol, the first and second protocols being different,
   obtaining identifier information for the target devices used by the first driver in a first format and complying with the first protocol;
   converting the identifier information for the target devices from the first format supported by the first driver to a second format supported by the second driver the first format being different from the second format; and
   automatically persistently binding the converted target device identifier information to a port of the peripheral device such that the second driver can use the persistently bound converted target device identifier information to communicate with the target devices via the port without having to manually enter target device identifier information in the second format; wherein the first driver is a SCSIport driver and the second driver is a STORport driver.

2. The method of claim 1, wherein the peripheral device is a host bus adapter coupled to a host system in a storage area network.

3. The method of claim 2, wherein the target devices are storage devices used by the host system to read data from and/or write data to.

4. The method of claim 1, wherein the identifier information is a target identifier that is used by a management application to identify a target that is bound to a particular port of the peripheral device and the target identifier information is different from a worldwide port name.

5. The method of claim 1, wherein the converted identifier information is stored in a Windows registry.

6. A computer implemented method for replacing a SCSIport driver at a computing system with a STORport driver without having to manually enter target device identifier information, the computing system coupled to an adapter that is operationally coupled to one or more target devices in a storage area network, the method comprising:
   obtaining identifier information for the target devices used by the SCSIport driver in a first format supported by the SCSIport driver;
   converting the identifier information for the target devices from the first format supported by the SCSIport driver to a second format supported by the STORport driver; and
   automatically persistently binding the converted target device identifier information to a port of the adapter such that the STORport driver can use the persistently bound converted target device identifier information to communicate with the target devices via the port.

7. The method of claim 6, wherein the target devices are storage devices used by the computing system to read data from and write data to.

8. The method of claim 6, wherein the identifier information is a target identifier that is used by a management application to identify a target that is bound to a particular port of a peripheral device and the target identifier information is different from a worldwide port name.

9. The method of claim 6, wherein the converted identifier information is stored in a Windows registry.

10. A host computing system operationally coupled to a peripheral device that is operationally coupled to plural target devices via a storage area network ("SAN"), comprising:
    a processor for executing a management application for managing plural SAN components; and a first driver for communicating with the peripheral device, wherein the first driver is replaced with a second driver, the first driver complying with a first protocol and the second driver complying with a second protocol, the first and second protocols being different, identifier information for the target devices that is used by the first driver in a first format and complying with the first protocol is converted from a format supported by the first driver to a second format supported by the second driver, and the converted target device identifier information is automatically persistently bound to a port of the peripheral device such that the second driver can use the persistently bound converted target device identifier information to communicate with the target devices via the port without having to manually enter target device identifier information in the second format; wherein the first driver is a SCSIport driver and the second driver is a STORport driver.

11. The host computing system of claim 10, wherein the peripheral device is a host bus adapter.

12. The host computing system of claim 10, wherein the target devices are storage devices used by the host computing system to read data from and write data to.

13. The host computing system of claim 10, wherein the identifier information is a target identifier that is used by the management application to identify a target that is bound to a particular port of the peripheral device and the target identifier information is different from a worldwide port name.

14. The host computing system of claim 10, wherein the converted 30 identifier information is stored in a Windows registry.

15. The host computing system of claim 10, wherein the management application performs the conversion.

16. The method of claim 4, wherein the management application performs the conversion.

* * * * *

UNITED STATES PATENT AND TRADEMARK OFFICE
CERTIFICATE OF CORRECTION

PATENT NO. : 8,464,238 B1
APPLICATION NO. : 11/343596
DATED : June 11, 2013
INVENTOR(S) : Saptarshi Chakraborty et al.

It is certified that error appears in the above-identified patent and that said Letters Patent is hereby corrected as shown below:

On the Title Page, Item (56)

On page 2, under "OTHER PUBLICATIONS", in column 1, line 3, Delete "Coporation." and insert -- Corporation. --, therefor.

On page 2, under "OTHER PUBLICATIONS", in column 2, line 5, Delete "Wndows" and insert -- Windows --, therefor.

On page 2, under "OTHER PUBLICATIONS", in column 2, line 21, Delete "[Retrived" and insert -- [Retrieved --, therefor.

In the Claims

In column 6, line 9, In Claim 3, delete "and/or" and insert -- and --, therefor.

In column 7, line 12, In Claim 14, after "converted" delete "30".

Signed and Sealed this
Twenty-first Day of October, 2014

Michelle K. Lee
*Deputy Director of the United States Patent and Trademark Office*